(12) United States Patent
Ichiboshi et al.

(10) Patent No.: US 9,092,083 B2
(45) Date of Patent: Jul. 28, 2015

(54) CONTACT DETECTING DEVICE, RECORD DISPLAY DEVICE, NON-TRANSITORY COMPUTER READABLE MEDIUM, AND CONTACT DETECTING METHOD

(75) Inventors: Akira Ichiboshi, Kanagawa (JP);
Tsutomu Ishii, Kanagawa (JP);
Takayuki Takeuchi, Kanagawa (JP);
Shigehiko Sasaki, Kanagawa (JP);
Masahiro Sato, Kanagawa (JP);
Kyotaro Tomoda, Kanagawa (JP);
Takao Naito, Kanagawa (JP); Minoru Mitsui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 238 days.

(21) Appl. No.: 13/458,786

(22) Filed: Apr. 27, 2012

(65) Prior Publication Data
US 2013/0093698 A1 Apr. 18, 2013

(30) Foreign Application Priority Data
Oct. 12, 2011 (JP) ................................ 2011-225202

(51) Int. Cl.
G09G 5/00 (2006.01)
G06F 3/041 (2006.01)

(52) U.S. Cl.
CPC ...................................... *G06F 3/041* (2013.01)

(58) Field of Classification Search
CPC .................................. G06F 3/041; G09G 3/36
USPC .............. 345/87, 156–178; 178/18.01–20.04; 382/312, 191, 1, 81, 203, 210
See application file for complete search history.

(56) References Cited

U.S. PATENT DOCUMENTS

| | | | |
|---|---|---|---|
| 2009/0244033 A1* | 10/2009 | Westerman et al. | 345/174 |
| 2010/0079413 A1* | 4/2010 | Kawashima et al. | 345/175 |
| 2011/0032192 A1* | 2/2011 | Mills et al. | 345/173 |
| 2011/0043473 A1* | 2/2011 | Kozuma | 345/173 |
| 2011/0080365 A1* | 4/2011 | Westerman | 345/173 |

(Continued)

FOREIGN PATENT DOCUMENTS

| | | |
|---|---|---|
| JP | 08-110830 A | 4/1996 |
| JP | 09-044293 A | 2/1997 |
| JP | 2011-070658 A | 4/2011 |

OTHER PUBLICATIONS

Office Action issued by Australian Patent Office in corresponding Australian Patent application No. 2012203129, dated May 24, 2013.

*Primary Examiner* — Kent Chang
*Assistant Examiner* — Nelson Rosario
(74) *Attorney, Agent, or Firm* — Sughrue Mion, PLLC

(57) ABSTRACT

A contact detecting device includes a plurality of detecting elements, a generating unit, and a determining unit. The plurality of detecting elements are related to one another in a two-dimensional configuration on a predetermined contacted surface, and respectively detect a contact of an object with the contacted surface. The generating unit generates, on the basis of the result of detection by the plurality of detecting elements, feature information representing a feature of a trajectory drawn on the basis of a contact of an object with the contacted surface. The determining unit determines whether or not the feature information generated by the generating unit corresponds to previously registered specific contact feature information representing a feature of a trajectory drawn on the basis of a specific contact of an object with the contacted surface.

16 Claims, 12 Drawing Sheets

(56) References Cited

U.S. PATENT DOCUMENTS

| | | | |
|---|---|---|---|
| 2012/0169650 A1* | 7/2012 | Chang | 345/174 |
| 2013/0009896 A1* | 1/2013 | Zaliva | 345/173 |
| 2013/0120279 A1* | 5/2013 | Plichta et al. | 345/173 |
| 2013/0181908 A1* | 7/2013 | Santiago et al. | 345/173 |

* cited by examiner

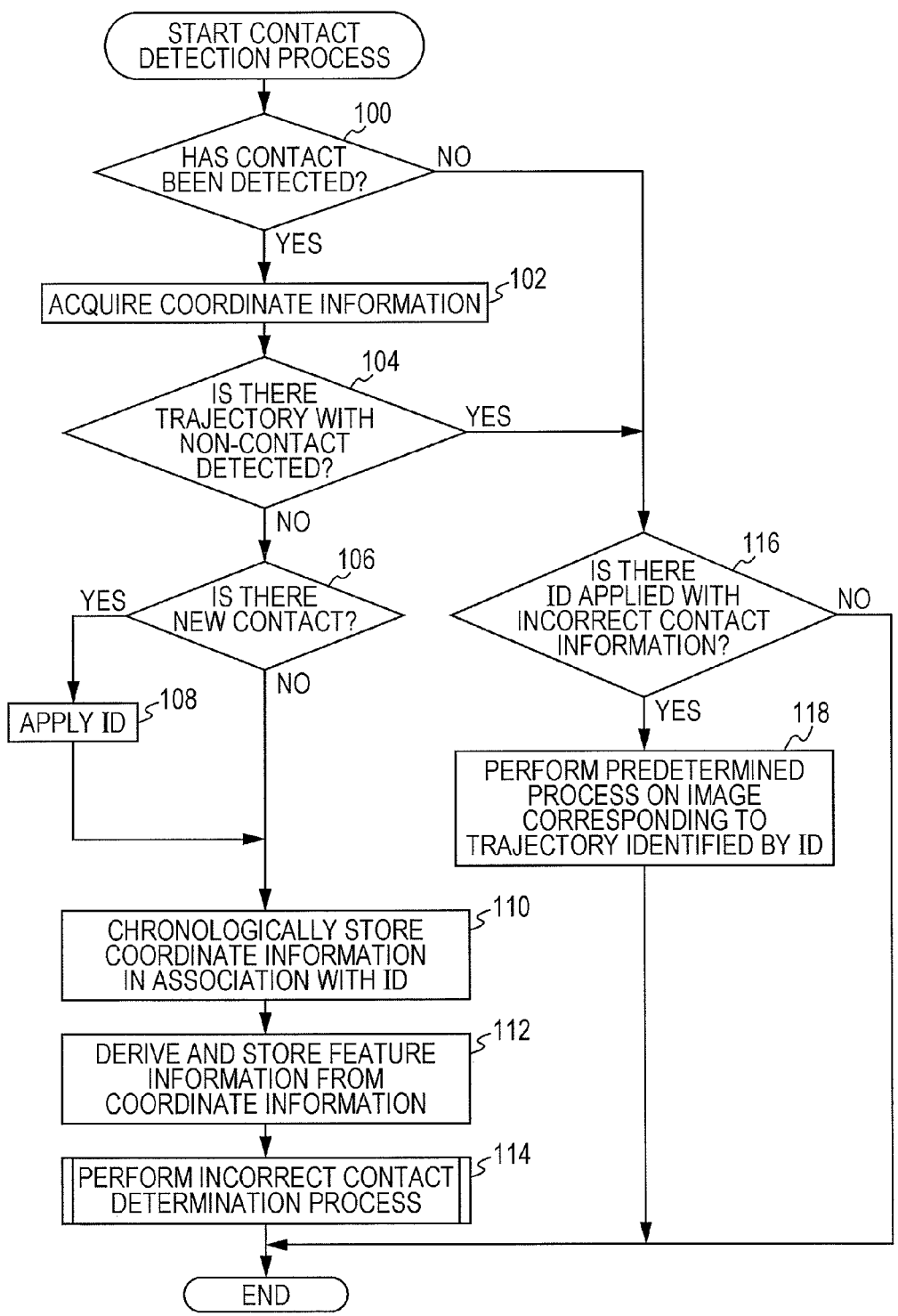

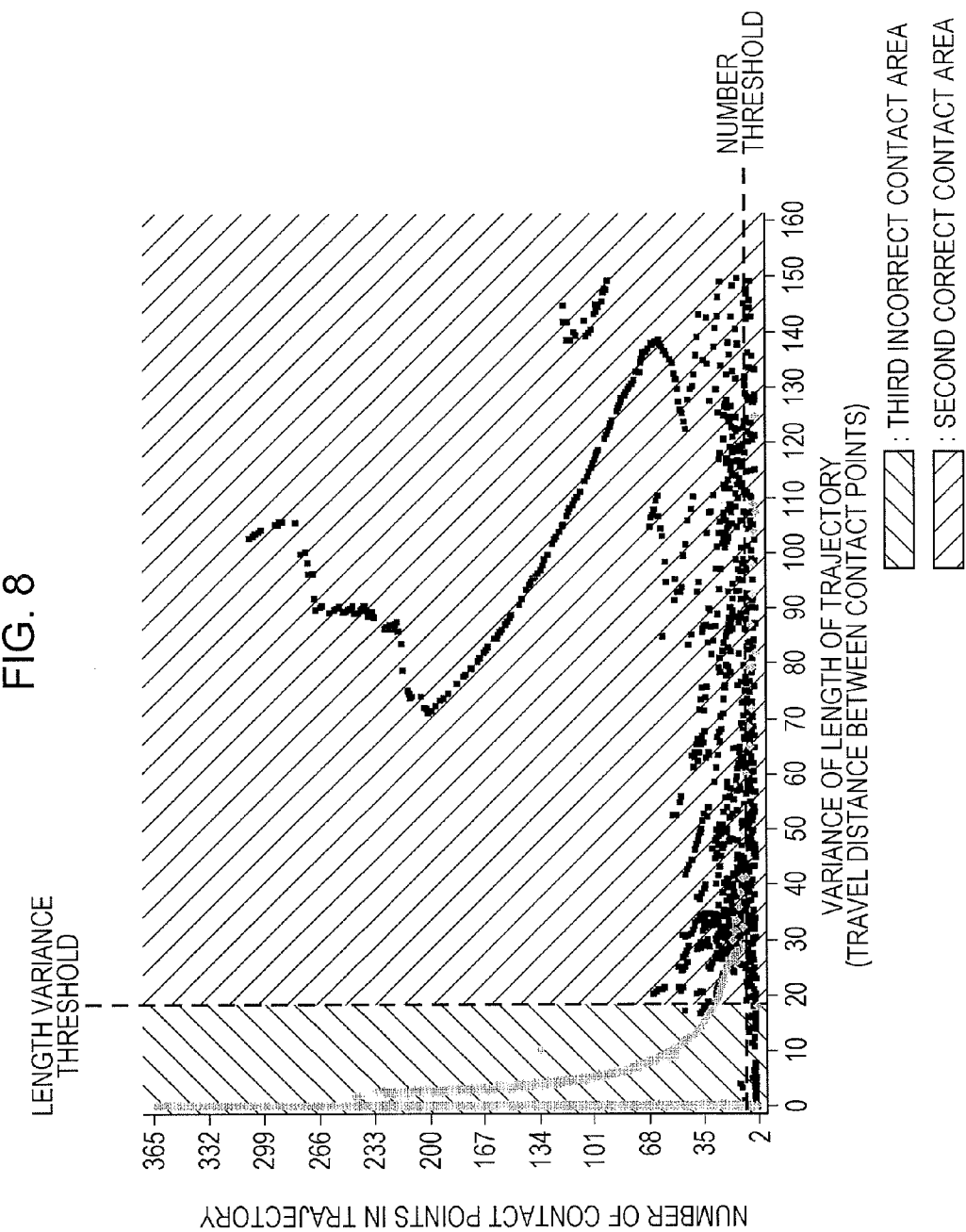

FIG. 9

```
size <= S1
|  variance_length_trajectory <= T1
|  |  points_stroke <= P1: pen
|  |  points_stroke > P1
|  |  |  variance_length_trajectory <= T3: hand
|  |  |  variance_length_trajectory > T3
|  |  |  |  points_stroke <= P2: pen
|  |  |  |  points_stroke > P2: hand
|  variance_length_trajectory > T1
|  |  valiance_size <= VS1: pen
|  |  valiance_size > VS1
|  |  |  variance_length_trajectory <= T4: hand
|  |  |  variance_length_trajectory > T4: pen size > S1
|  variance_length_trajectory <= T2
|  |  points_stroke <= P3
|  |  |  size <= S2
|  |  |  |  points_stroke <= P4: pen
|  |  |  |  points_stroke > P4: hand
|  |  |  size > S2: hand
|  |  points_stroke > P3: hand
|  variance_length_trajectory > T2
|  |  size <= S3: pen
|  |  size > S3: hand
```

FIG. 14

| NUMBER OF CONTACT POINTS IN TRAJECTORY | WEIGHT |
|---|---|
| 1 TO 39 | 1.0 |
| 40 TO 79 | 1.2 |
| 80 TO 119 | 1.4 |
| 120 OR MORE | 1.6 |

… (1)

CONTACT DETECTING DEVICE, RECORD DISPLAY DEVICE, NON-TRANSITORY COMPUTER READABLE MEDIUM, AND CONTACT DETECTING METHOD

CROSS-REFERENCE TO RELATED APPLICATIONS

This application is based on and claims priority under 35 USC 119 from Japanese Patent Application No. 2011-225202 filed Oct. 12, 2011.

BACKGROUND

Technical Field

The present invention relates to a contact detecting device, a record display device, a non-transitory computer readable medium, and a contact detecting method.

SUMMARY

According to an aspect of the invention, there is provided a contact detecting device configured to include a plurality of detecting elements, a generating unit, and a determining unit. The plurality of detecting elements are related to one another in a two-dimensional configuration on a predetermined contacted surface, and respectively detect a contact of an object with the contacted surface. The generating unit generates, on the basis of the result of detection by the plurality of detecting elements, feature information representing a feature of a trajectory drawn on the basis of a contact of an object with the contacted surface. The determining unit determines whether or not the feature information generated by the generating unit corresponds to previously registered specific contact feature information representing a feature of a trajectory drawn on the basis of a specific contact of an object with the contacted surface.

BRIEF DESCRIPTION OF THE DRAWINGS

An exemplary embodiment of the present invention will be described in detail based on the following figures, wherein:

FIG. 3 is a flowchart illustrating an example of process flow of a contact detection process program according to the exemplary embodiment;

FIG. 8 is a diagram illustrating a correlation between the number of contact points in the trajectory and the variance of the length of the trajectory as constituent elements of a decision tree used in the liquid crystal pen tablet according to the exemplary embodiment;

FIG. 9 is a code diagram illustrating an example of a determination method according to a decision tree used in the liquid crystal pen tablet according to the exemplary embodiment;

FIG. 14 is a schematic diagram illustrating an example of a table used in an incorrect contact detection process of the liquid crystal pen tablet according to the exemplary embodiment.

DETAILED DESCRIPTION

An example of an exemplary embodiment for implementing the present invention will be described in detail below with reference to the drawings.

Figure 1:
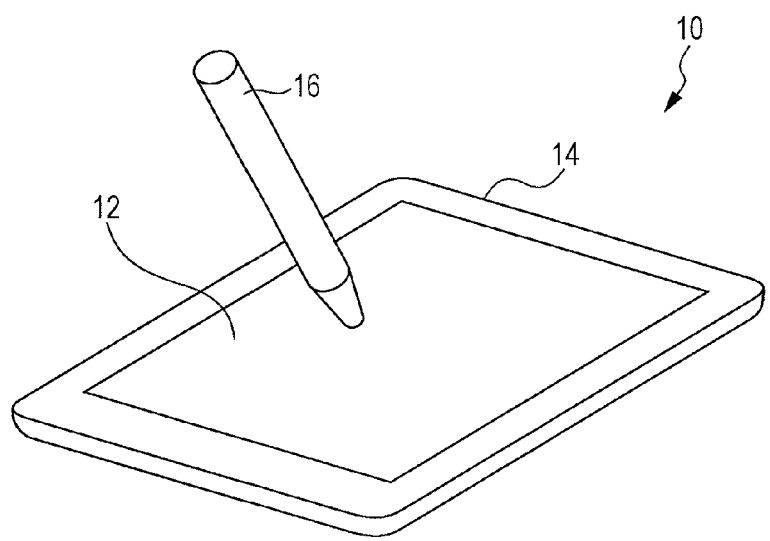
FIG. 1 is a schematic perspective view illustrating the exterior of a liquid crystal pen tablet according to an exemplary embodiment.

FIG. 1 is a schematic perspective view illustrating the exterior of a liquid crystal pen tablet 10 according to the present exemplary embodiment. As illustrated in FIG. 1, the liquid crystal pen tablet 10 is configured to include a record display device 14 including a touch panel display 12 and a stylus pen 16 serving as a pen-type input device.

Figure 2:
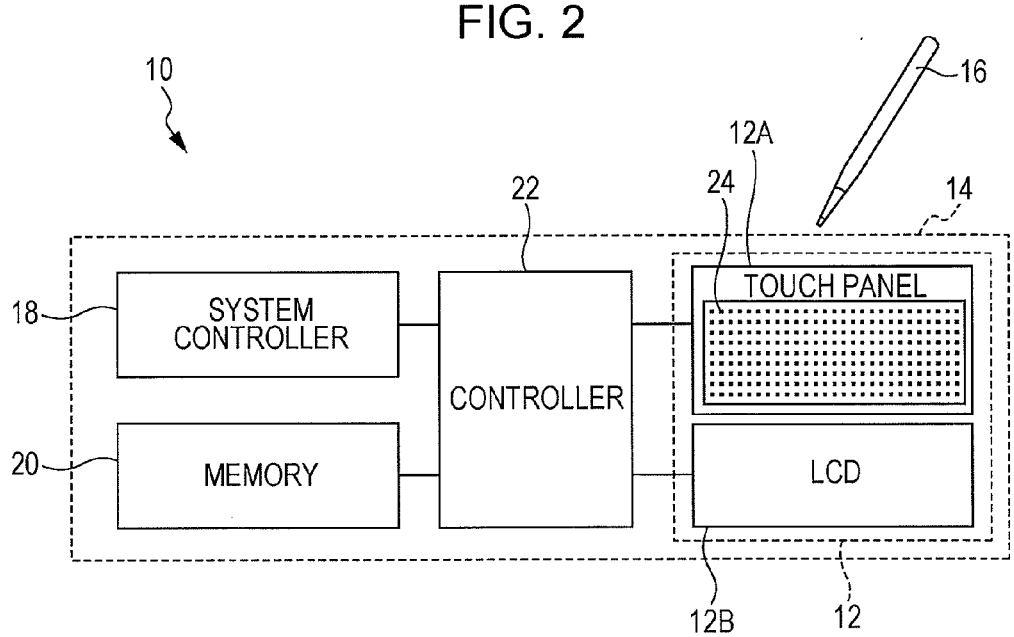
FIG. 2 is a block diagram illustrating a configuration of major portions of an electrical system of a record display device according to the exemplary embodiment.

FIG. 2 is a block diagram illustrating a configuration of major portions of an electrical system of the record display device 14 according to the present exemplary embodiment. As illustrated in FIG. 2, the record display device 14 is configured to include the touch panel display 12, a system controller 18, a memory 20, and a controller 22.

The touch panel display 12 includes a touch panel 12A and a liquid crystal display (LCD) 12B. Specifically, the touch panel display 12 is configured to have the transmissive touch panel 12A superimposed on the LCD 12B. The touch panel 12A is touched by a user, and thereby receives an instruction from the user. The LCD 12B displays various information on a display surface (screen) thereof.

The touch panel 12A according to the present exemplary embodiment is an electrostatic capacitance touch panel which detects contact and non-contact by capturing a change in electrostatic capacitance. The touch panel 12A includes plural electrostatic capacitance elements (e.g., capacitors) 24 as an example of plural detecting elements arranged as related to one another in a two-dimensional configuration (e.g., matrix configuration) on a predetermined surface (e.g., front or rear surface) of the touch panel 12A to correspond to the respective positions of pixels of the LCD 12B. In the electrostatic capacitance elements 24, capacitive coupling is caused by the approach of an object, such as the stylus pen 16, a finger, or a hand, and thereby the contact of the object with the touch panel 12A is detected. The electrostatic capacitance touch panel is an example, and the touch panel 12A may be an electromagnetic induction touch panel, an infrared touch panel, a surface acoustic wave touch panel, a resistance film touch panel, or the like, and may be any touch panel capable of detecting a contact point.

The system controller 18 is configured to include a central processing unit (CPU), and controls an overall operation of the record display device 14 by executing a predetermined control program. The memory 20 is configured to include a random access memory (RAM), a read only memory (ROM), and a secondary memory (e.g., flash memory). The RAM is a volatile storage device used as a work area or the like in the execution of various programs. The ROM previously stores later-described incorrect contact feature information, various programs, various parameters, various table information, and so forth. The secondary memory is a nonvolatile storage medium for storing various information that is required to be retained even if a power supply switch of the liquid crystal pen tablet 10 is tuned off.

The controller 22 is configured to include a CPU (CPU different from the CPU included in the system controller 18), and is connected to the touch panel 12A, the LCD 12B, the system controller 18, and the memory 20. Therefore, under an instruction from the system controller 18 and on the basis of the various programs, various parameters, various table information, and so forth read from the memory 20, the controller 22 performs the acquisition of the contents of the instruction from the user to the touch panel 12A, the display on the LCD 12B of information read from the memory (including information representing images, characters, patterns, signs, and so forth), and the display on the LCD 12B of various information according to the contents of the instruction from the user to the touch panel 12A (including information representing images, characters, patterns, signs, and so forth).

In the liquid crystal pen tablet 10 configured as described above, when a trajectory (contact mark (stroke)) is drawn on the touch panel 12A on the basis of the contact detected by the touch panel 12A, coordinate information identifying contact points corresponding to constituent elements of the drawn trajectory (e.g., information representing two-dimensional coordinates identifying the positions of the electrostatic capacitance elements 24, with a predetermined point on the touch panel 12A set as the origin) is stored in a predetermined storage area α of the memory 20, and a trajectory identified by the coordinate information stored in the storage area α (trajectory corresponding to the trajectory drawn on the touch panel 12A) is displayed on the screen of the LCD 12B by the controller 22.

Meanwhile, the contact detected by the touch panel 12A is roughly divided into a contact for inputting information that is to be recorded by the liquid crystal pen tablet 10 (correct contact) and a contact resulting in incorrect input of information that is not to be recorded by the liquid crystal pen tablet 10 (incorrect contact).

In the past, however, due to the absence of a technology which highly accurately distinguishes between the correct contact and the incorrect contact, there have been cases wherein the incorrect contact is recognized as the correct contact or the correct contact is recognized as the incorrect contact. In some cases, therefore, display of unintended information or a failure to display intended information on the screen of the LCD 12B has occurred.

In the liquid crystal pen tablet 10 according to the present exemplary embodiment, therefore, a contact detection process is performed which detects the contact of an object with the touch panel 12A and highly accurately identifies the incorrect contact.

In the liquid crystal pen tablet 10 according to the present exemplary embodiment, various processes for realizing the contact detection process are realized by a software configuration. An example thereof is a configuration which executes a program by using a computer. It is needless to say, however, that the realization of the processes is not limited to the realization by such a software configuration, and that the processes may be realized by a hardware configuration or the combination of a hardware configuration and a software configuration.

In the following, description will be made of a case where the controller 22 of the liquid crystal pen tablet 10 according to the present exemplary embodiment executes a contact detection process program to thereby realize the contact detection process. Configurations applicable in this case include, for example, a configuration which previously stores the contact detection process program in the ROM area of the memory 20, a configuration which provides the contact detection process program with the contents thereof stored in a computer-readable recording medium, and a configuration which distributes the contact detection process program through a wired or wireless communication unit.

FIG. 3 is a flowchart illustrating an example of process flow of the contact detection process program according to the present exemplary embodiment. To avoid confusion, the following description will be made of, as an example, a case where the contact detection process program is executed by the control unit 22 every predetermined time (e.g., 20 ms herein). Further, to avoid confusion, description will be made herein of a case where the contact of the stylus pen 16 with the touch panel 12A is determined as the correct contact, and any other contact than the contact of the stylus pen 16 with the touch panel 12A (e.g., contact of a finger or hand) is determined as the incorrect contact. Further, the word "trajectory" used in the present specification means a sequence of contact points obtained when an object comes into contact with the touch panel 12A. The word includes the concept of a set of plural consecutive coordinate points on a two-dimensional coordinate plane obtained by a continuous contact with the touch panel 12A and also the concept of one contact point obtained by a contact with one point in the touch panel 12A. Further, the concept of "continuous" herein includes the concept of "chronologically continuous" and also the concept of "simultaneous." If an object simultaneously comes into contact with a set of plural consecutive points on a two-dimensional coordinate plane in the touch panel 12A, therefore, the points are captured as the constituent elements of a unit of trajectory.

Figure 4A:
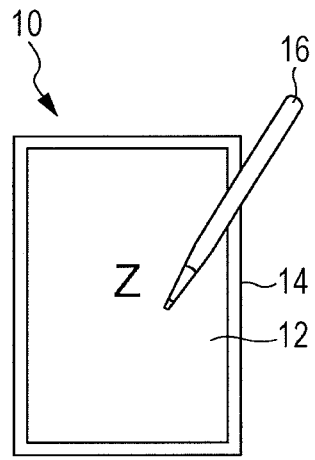
FIGS. 4A and 4B are schematic diagrams illustrating a method of defining a unit of trajectory drawn on the liquid crystal pen tablet according to the exemplary embodiment.
Figure 4B:
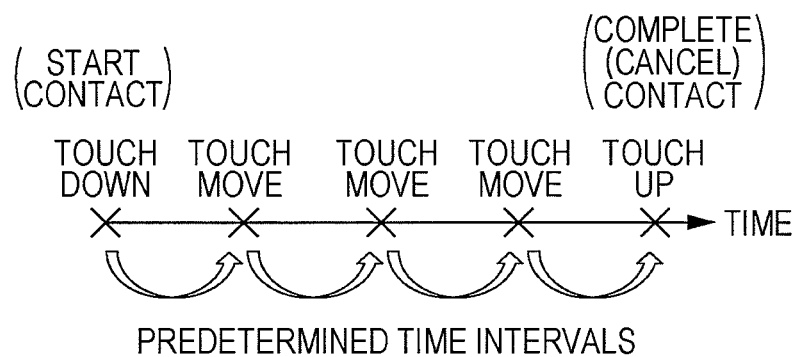

At step 100 in FIG. 3, determination is made on whether or not a contact of an object with the touch panel 12A has been detected. If the determination is positive, the procedure proceeds to step 102. A contact point detected in the process of step 100 is determined as a constituent element of a unit of trajectory. For example, the present contact detection process program is executed every 20 ms in the present exemplary embodiment. Therefore, if a letter "Z" is written in a single stroke on the touch panel 12A by the stylus pen 16 to display the letter "Z" on the touch panel display 12, as illustrated in FIG. 4A, the contact of a pen tip of the stylus pen 16 is detected at intervals of 20 ms. An example illustrated in FIG. 4B schematically illustrates an exemplary embodiment in which contacts at five points are detected during the drawing of the letter "Z." These points are detected at intervals of a predetermined time (20 ms). Further, if plural contact points are detected at step 100, the contact points are handled as constituent elements respectively forming separate units of trajectories.

At step 102, coordinate information identifying the position of the contact point detected in the process of the above-described step 100 is acquired, and thereafter the procedure proceeds to step 104. At step 104, determination is made on whether or not there is a trajectory in which non-contact of an object relative to the touch panel 12A has been detected. If the determination is negative, the procedure proceeds to step 106. That is, at the present step 104, if there is a continuous contact with the touch panel 12A, which has started before the current execution of the contact detection process program, determination is made on whether or not the contact has been canceled (whether or not the trajectory has been cut off in accordance with the separation of an object from the touch panel 12A). If the determination is negative (including a case where there is no continuous contact with the touch panel 12A before the current execution of the contact detection process program), the procedure proceeds to step 106.

At step 106, determination is made on whether or not a new contact has been detected by the current execution of the contact detection process program. If the determination is positive, the procedure proceeds to step 108. Meanwhile, if the determination is negative, the procedure proceeds to step 110. Herein, the state in which a "new contact" is detected (a case where the determination at step 106 is positive) means the state in which the transition speed of the contact point is higher than a predetermined transition speed. For example, if an object first comes into contact with a contact point, it is considered that the transition speed of the contact point is higher than the predetermined transition speed. Conversely, the state in which a "new contact" is not detected (a case where the determination at step 106 is negative) means the state in which the transition speed of the contact point is equal to or lower than the predetermined transition speed. For example, if the contact with the touch panel 12A is continuing, it is considered that the transition speed of contact point is equal to or lower than the predetermined transition speed.

At step 108, a pointer identifier (ID) as an example of unique identification information is applied to the trajectory drawn on the touch panel 12A on the basis of the contact detected in the process of the above-described step 100. Thereafter, the procedure proceeds to step 110. For example, in this case, one pointer ID is applied to the trajectory identified on the basis of the contact first detected by the process of the above-described step 100. If there are plural trajectories each identified on the basis of the contact first detected by the process of the above-described step 100, each of the trajectories is applied with a pointer ID uniquely set therefor. Even if plural objects simultaneously come into contact with plural locations in the touch panel 12A, therefore, trajectories based on individual contacts are identified by respective pointer IDs.

At step 110, the coordinate information acquired in the process of the above-described step 102 is chronologically stored in the storage area α of the memory 20 in association with the pointer IDs applied to the respective trajectories. For example, the coordinate information and time information indicating the time of acquisition of the coordinate information are stored in the storage area α in units of pointer IDs, with the coordinate information and the time information associated with each other.

At the following step 112, the coordinate information currently stored in the storage area α is acquired for each of the pointer IDs. Then, feature information representing a feature of a trajectory is derived for each of the pointer IDs from the coordinate information acquired for each of the pointer IDs, and the derived feature information is chronologically stored in the storage area α for the respective pointer IDs. The feature information includes, for example, magnitude information representing the magnitude of the current trajectory, degree information representing the degree of variation of the magnitude of the current trajectory, and duration-based information derived on the basis of the duration of a contact for drawing the current trajectory. For example, the magnitude information includes the area of a trajectory, the constituent elements of which correspond to the contact points currently included in the touch panel 12A, and the length of the trajectory (e.g., the travel distance between the contact points derived from two-dimensional coordinates herein). The degree information includes the variance of the area of a trajectory, the constituent elements of which correspond to the contact points currently included in the touch panel 12A, and the variance of the length of the trajectory. The duration-based information includes the number of contact points in a trajectory (one stroke), the constituent elements of which correspond to the contact points currently included in the touch panel 12A. The present exemplary embodiment adopts, as an example, the area of the trajectory as the magnitude information, the variance of the area of the trajectory and the variance of the length of the trajectory as the degree information, and the number of the contact points in the trajectory as the duration-based information. Herein, as to the number of the contact points in the trajectory, a contact with one point is counted as one contact every 20 ms. Further, it has already been verified by inventors that the variance of the area of the trajectory and the variance of the length of the trajectory are greater in the contact of the stylus pen 16 (correct contact) than in the incorrect contact of an object other than the stylus pen 16 (e.g., finger or hand). This is considered to be because the travel distance of the correct contact is greater than the travel distance of the incorrect contact.

Further, at the above-described step 112, the present exemplary embodiment applies to the pointer ID a weight according to the number of the contact points in the trajectory identified by the pointer ID. Specifically, the larger is the number of the contact points in the trajectory, the greater is the weight applied to the pointer ID. This is a process based on a verified fact that the larger is the number of the contact points in the trajectory, the larger is the number of coordinate information items used to derive the feature information, and the higher is the accuracy of determination. The weight is updated every time the number of the contact points in the trajectory is updated. The present exemplary embodiment applies the weight by using, for example, the table illustrated in FIG. 14. According to the table illustrated in FIG. 14, when the number of the contact points in the trajectory ranges from 1 to 39, a value 1.0 is adopted as the weight. When the number of the contact points in the trajectory ranges from 40 to 79, a value 1.2 is adopted as the weight. When the number of the contact points in the trajectory ranges from 80 to 119, a value 1.4 is adopted as the weight. When the number of the contact points in the trajectory is equal to or more than 120, a value 1.6 is adopted as the weight. The method of applying the weight is not limited to the method using the table. As well as this method, a method using, for example, an operational equation having a solution corresponding to the weight may be employed.

Figure 5:
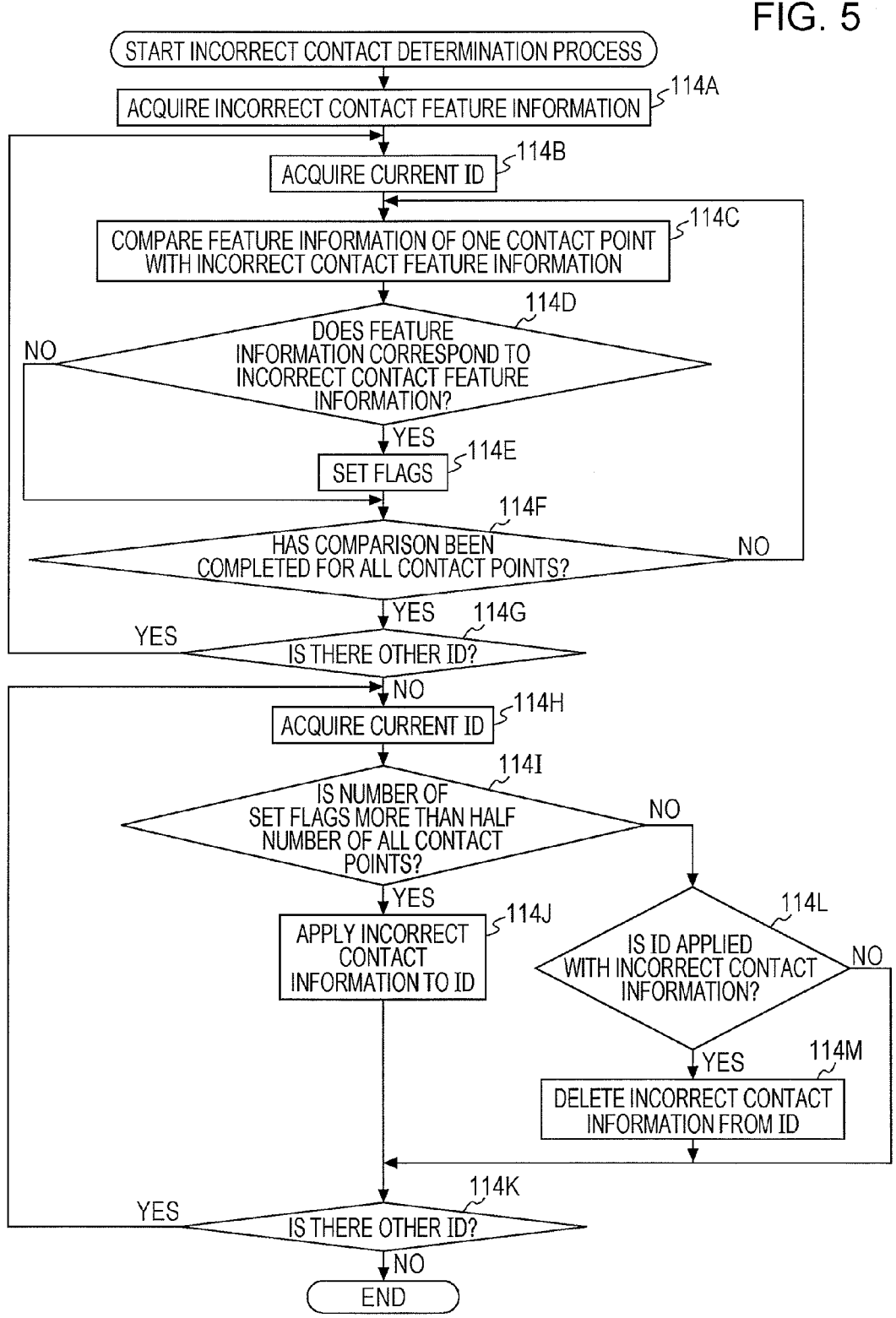
FIG. 5 is a flowchart illustrating an example of process flow of an incorrect contact determination process program according to the exemplary embodiment.
Figure 6:
FIG. 6 is a diagram illustrating a correlation between the variance of the length of the trajectory and the contact area as constituent elements of a decision tree used in the liquid crystal pen tablet according to the exemplary embodiment.
Figure 7:
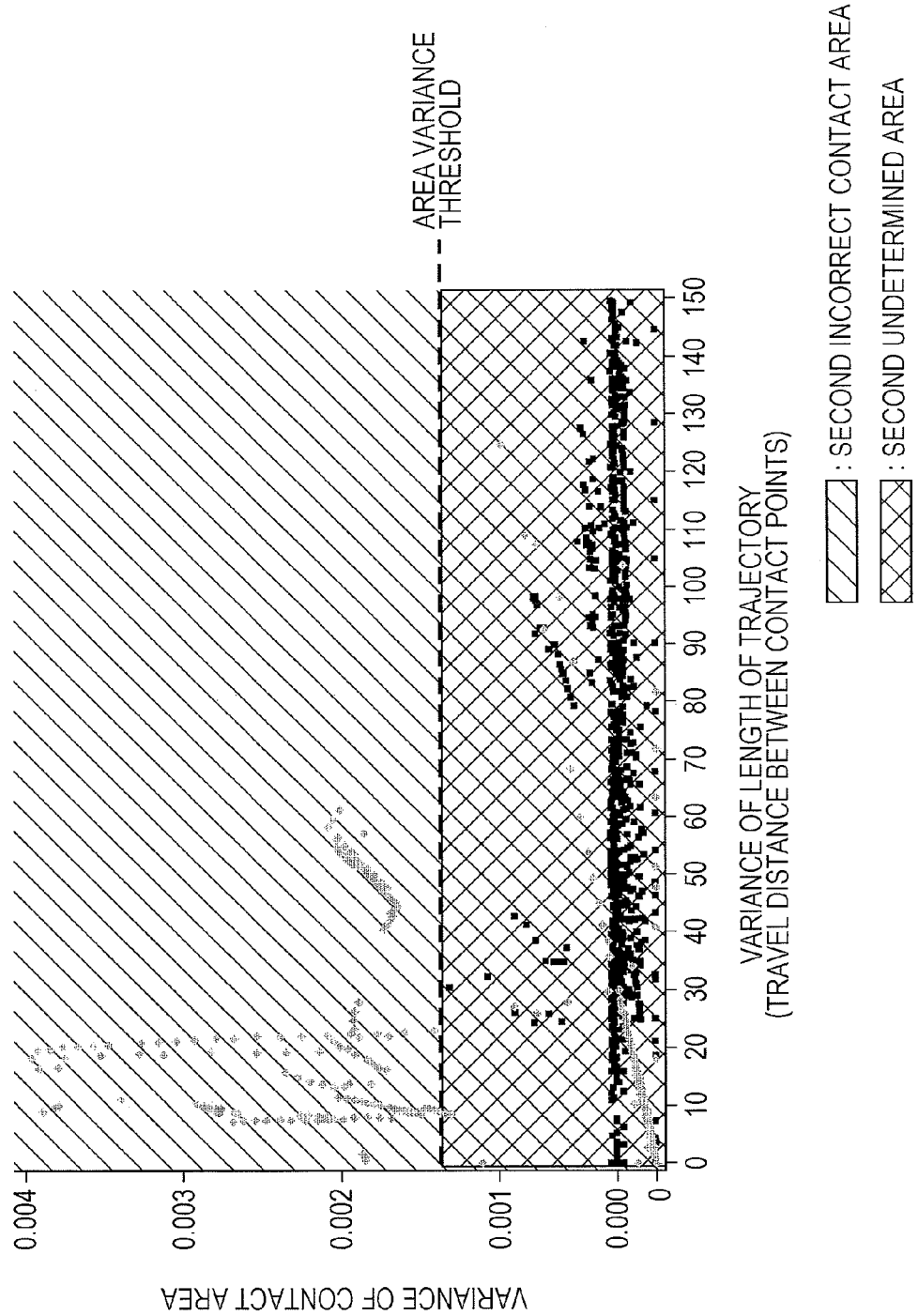
FIG. 7 is a diagram illustrating a correlation between the variance of the contact area and the variance of the length of the trajectory as constituent elements of a decision tree used in the liquid crystal pen tablet according to the exemplary embodiment.

After the execution of the process of the above-described step 112, the procedure proceeds to step 114 to execute an incorrect contact determination process program. FIG. 5 illustrates an example of process flow of the incorrect contact determination process program. As illustrated in the drawing, previously registered incorrect contact feature information is acquired from the memory 20 at step 114A. The present exemplary embodiment adopts, as the incorrect contact feature information, previously registered information representing a feature of the trajectory based on the incorrect contact of an object with the touch panel 12A. Specifically, first incorrect contact area information to third incorrect contact area information illustrated in FIGS. 6 to 8 are examples of the incorrect contact feature information. The example illustrated in FIG. 6 illustrates information representing an incorrect contact area (first incorrect contact area information), information representing a correct contact area (first correct contact area information), and information representing an area which has not been determined as the incorrect contact area or the correct contact area and is open to further determination (first undetermined area information), which are defined by a threshold indicating the boundary between the range of the variance of the length of the trajectory representing the incorrect contact and the range of the variance of the length of the trajectory representing the correct contact (length variance threshold) and a threshold indicating the boundary between the range of the area of the trajectory (contact area) representing the incorrect contact and the range of the area of the trajectory (contact area) representing the correct contact. Further, the example illustrated in FIG. 7 illustrates information representing an incorrect contact area (second incorrect contact area information) and information representing an area which has not been determined as the incorrect contact area or the correct contact area and is open to further determination (second undetermined area information), which are defined by a threshold indicating the boundary between the range of the variance of the area of the trajectory representing the incorrect contact and the range of the variance of the area of the trajectory representing the correct contact (area variance threshold) and the length variance threshold. Further, the example illustrated in FIG. 8 illustrates information representing an incorrect contact area (third incorrect contact area information) and information representing a correct contact area (second correct contact area information), which are defined by a threshold indicating the boundary between the range of the number of the contact points in the trajectory representing the incorrect contact and the range of the number of the contact points in the trajectory representing the correct contact (number threshold) and the length variance threshold.

At the following step 114B, the pointer ID of the trajectory to be subjected to the determination process (current pointer ID) is acquired from the pointer IDs applied to the trajectories, the constituent elements of each of which correspond to the current contact points of an object with the touch panel 12A. Thereafter, the procedure proceeds to step 114C. At step 114C, in the trajectory corresponding to the current pointer ID acquired in the process of the above-described step 114B, the feature information of a contact point not subjected to the present process is acquired. Then, a comparison is made between the acquired feature information and the incorrect contact feature information acquired in the process of the above-described step 114A. At step 114C, a further comparison is made between the weight applied to the number of the contact points in the trajectory as the feature information and the predetermined weight (1.4 herein).

At the following step 114D, as a result of comparison in the process of the above-described step 114C between the weight applied to the number of the contact points in the trajectory as the feature information and the predetermined weight, determination is made on whether or not the weight applied to the number of the contact points in the trajectory as the feature information is less than the predetermined weight. Herein, if the determination is negative, the procedure proceeds to step 114F. If the determination is positive, determination is made, as a result of comparison between the feature information and the incorrect contact feature information in the process of the above-described step 114C, on whether or not the feature information corresponds to the incorrect contact feature information. Herein, if the determination is positive, the procedure proceeds to step 114E. Meanwhile, if the determination is negative, the procedure proceeds to step 114F. In the present exemplary embodiment, the process of step 114D includes the process of making determination as to the result of comparison of the weights. This process, however, may be omitted. In this case, the total processing time taken for the incorrect contact determination process is reduced. To highly accurately determine the incorrect contact, however, it is desirable to include the process of making determination as to the result of comparison of the weights, as exemplified in step 114D of the present exemplary embodiment. In the present process, therefore, description is made of an example which performs a process including the determination as to the weight.

At step 114D, whether or not the feature information corresponds to the incorrect contact feature information is determined on the basis of decision trees including the incorrect contact feature information. For example, whether or not the feature information corresponds to the incorrect contact feature information is determined on the basis of a decision tree using the variance of the length of the trajectory and the area of the trajectory illustrated in FIG. 6, a decision tree using the variance of the area of the trajectory and the variance of the length of the trajectory illustrated in FIG. 7, and a decision tree using the number of the contact points in the trajectory and the variance of the length of the trajectory illustrated in FIG. 8. Specifically, determination is made on whether or not the variance of the length of the trajectory and the area of the trajectory as the feature information acquired in the process of the above-described step 114C are included in the area represented by the first incorrect contact area information illustrated in FIG. 6 as an example. If the variance of the length of the trajectory and the area of the trajectory are included in the area, it is determined that the feature information corresponds to the incorrect contact feature information (positive determination at step 114D). If it is determined that the feature information does not correspond to the incorrect contact feature information, determination is made on whether or not the variance of the length of the trajectory and the area of the trajectory as the feature information are included in the area represented by the first correct contact area information. If the variance of the length of the trajectory and the area of the trajectory are included in the area, it is determined that the feature information does not correspond to the incorrect contact feature information (negative determination at step 114D). Herein, if the feature information is not included in either the area represented by the first incorrect contact area information or the area represented by the first correct contact area information, it is determined that the feature information is included in the area represented by the first undetermined area information. Then, determination is made on whether or not the variance of the area of the trajectory and the variance of the length of the trajectory as the feature information acquired in the process of the above-described step 114C are included in the area represented by the second incorrect contact area information illustrated in FIG. 7 as an example. If the variance of the area of the trajectory and the variance of the length of the trajectory are included in the area, it is determined that the feature information corresponds to the incorrect contact feature information (positive determination at step 114D). Herein, if the feature information is not included in the area represented by the second incorrect contact area information, it is determined that the feature information is included in the area represented by the second undetermined area information. Then, determination is made on whether or not the number of the contact points in the trajectory and the variance of the length of the trajectory as the feature information acquired in the process of the above-described step 114C are included in the area represented by the third incorrect contact area information illustrated in FIG. 8 as an example. If the number of the contact points in the trajectory and the variance of the length of the trajectory are included in the area, it is determined that the feature information corresponds to the incorrect contact feature information (positive determination at step 114D). If the number of the contact points in the trajectory and the variance of the length of the trajectory are not included in the area (if the number of the contact points in the trajectory and the variance of the length of the trajectory are included in the area represented by the second correct contact area information), it is determined that the feature information does not correspond to the incorrect contact feature information (negative determination at step 114D).

FIG. 9 illustrates an example of a method of determining, on the basis of a decision tree employed in the liquid crystal pen tablet 10 according to the present exemplary embodiment, whether or not a unit of trajectory is based on the incorrect contact. In FIG. 9, "size" means the area of a trajectory, the constituent elements of which correspond to the contact points currently included in the touch panel 12A, and "points_stroke" means the number of contact points in a trajectory, the constituent elements of which correspond to the contact points currently included in the touch panel 12A. Further, "variance_length_trajectory" means the variance of the length of a trajectory, the constituent elements of which correspond to the contact points currently included in the touch panel 12A, and "variance_size" means the variance of the area of a trajectory, the constituent elements of which correspond to the contact points currently included in the touch panel 12A. Further, in FIG. 9, "pen" means the contact of the stylus pen 16 (correct contact), and "hand" means the contact of, for example, a hand or finger other than the stylus pen 16 (incorrect contact).

In the liquid crystal pen tablet 10 according to the present exemplary embodiment, if whether or not the trajectory is based on the incorrect contact is determined on the basis of the decision tree, a result of "pen" or "hand" is finally obtained at the end of a branch of the decision tree, as illustrated in FIG. 9 as an example. In the example illustrated in FIG. 9, whether or not the area of the trajectory is equal to or less than an area threshold S1 is first determined, and determinations are then made in a branching manner with the use of respective thresholds. Specifically, if it is determined that the area of the trajectory is equal to or less than the area threshold S1, determination is made on whether or not the variance of the length of the trajectory is equal to or less than a length variance threshold T1. If it is determined that the variance of the length of the trajectory is equal to or less than the length variance threshold T1, determination is made on whether or not the number of the contact points in the trajectory is equal to or less than a number threshold P1. Herein, if the number of the contact points in the trajectory is equal to or less than the number threshold P1, it is determined that the trajectory is based on the correct contact.

If it is determined that the number of the contact points in the trajectory is not equal to or less than the number threshold P1, determination is made on whether or not the variance of the length of the trajectory is equal to or less than a length variance threshold T3. Herein, if the variance of the length of the trajectory is equal to or less than the length variance threshold T3, it is determined that the trajectory is based on the incorrect contact.

If the variance of the length of the trajectory is not equal to or less than the length variance threshold T3, determination is made on whether or not the number of the contact points in the trajectory is equal to or less than a number threshold P2. Herein, if the number of the contact points in the trajectory is equal to or less than the number threshold P2, it is determined that the trajectory is based on the correct contact. If the number of the contact points in the trajectory is not equal to or less than the number threshold P2, it is determined that the trajectory is based on the incorrect contact.

Meanwhile, if it is determined that the area of the trajectory is equal to or less than the area threshold S1, and if the variance of the length of the trajectory is not equal to or less than the length variance threshold T1, determination is made on whether or not the variance of the area of the trajectory is equal to or less than an area variance threshold VS1. Herein, if the variance of the area of the trajectory is equal to or less than the area variance threshold VS1, it is determined that the trajectory is based on the correct contact. If the variance of the area of the trajectory is not equal to or less than the area variance threshold VS1, determination is made on whether or not the variance of the length of the trajectory is equal to or less than a length variance threshold T4. Herein, if the variance of the length of the trajectory is equal to or less than the length variance threshold T4, it is determined that the trajectory is based on the incorrect contact. If the variance of the length of the trajectory is not equal to or less than the length variance threshold T4, it is determined that the trajectory is based on the correct contact.

Meanwhile, if it is determined that the area of the trajectory is not equal to or less than the area threshold S1, determination is made on whether or not the variance of the length of the trajectory is equal to or less than a length variance threshold T2. If it is determined that the variance of the length of the trajectory is equal to or less than the length variance threshold T2, determination is made on whether or not the number of the contact points in the trajectory is equal to or less than a number threshold P3. If the number of the contact points in the trajectory is equal to or less than the number threshold P3, determination is then made on whether or not the area of the trajectory is equal to or less than an area threshold S2. If the area of the trajectory is equal to or less than the area threshold S2, determination is then made on whether or not the number of the contact points in the trajectory is equal to or less than a number threshold P4. Herein, if the number of the contact points in the trajectory is equal to or less than the number threshold P4, it is determined that the trajectory is based on the correct contact. If the number of the contact points in the trajectory is not equal to or less than the number threshold P4, it is determined that the trajectory is based on the incorrect contact. If the area of the trajectory is not equal to or less than the area threshold S2, it is determined that the trajectory is based on the incorrect contact. If the number of the contact points in the trajectory is not equal to or less than the number threshold P3, it is determined that the trajectory is based on the incorrect contact.

If it is determined that the variance of the length of the trajectory is not equal to or less than the length variance threshold T2, determination is made on whether or not the area of the trajectory is equal to or less than an area threshold S3. If the area of the trajectory is equal to or less than the area threshold S3, it is determined that the trajectory is based on the correct contact. If the area of the trajectory is not equal to or less than the area threshold S3, it is determined that the trajectory is based on the incorrect contact.

At step 114E, flags are set in units of contact points subjected to the determination in the trajectory identified by the current pointer ID. Thereafter, the procedure proceeds to step 114F. In the present exemplary embodiment, the time information and the coordinate information are acquired in units of contact points. Therefore, the process of step 114E includes a configuration example which sets the flags to be associated in a one-to-one correspondence with the time information and the coordinate information corresponding to the contact points subjected to the determination.

At step 114F, determination is made on whether or not the comparison between the feature information and the incorrect contact feature information has been performed on all of the contact points forming the trajectory identified by the current pointer ID acquired in the process of the above-described step 114B. If the determination is negative, the procedure returns to the above-described step 114C. Meanwhile, if the determination is positive, the procedure proceeds to step 114G.

At step 114G, determination is made on whether or not there is any other pointer ID corresponding to a trajectory based on a currently detected contact. If the determination is positive, the procedure returns to the above-described step 114B. Meanwhile, if the determination is negative, the procedure proceeds to step 114H. At step 114H, the current pointer ID is acquired. Thereafter, the procedure proceeds to step 114I, and determination is made on whether or not the number of currently set flags is more than the number of contact points not set with flags (whether or not the number of currently set flags is more than half the number of the contact points forming the trajectory being subjected to the determination). If the determination is positive, the procedure proceeds to step 114J, and the pointer ID identifying the trajectory, in which the number of the flags has been determined to be more than half the number of all contact points, is applied with incorrect contact information indicating that the trajectory has been drawn on the basis of the incorrect contact. Thereafter, the procedure proceeds to step 114K.

Meanwhile, if the determination at step 114I is negative, the procedure proceeds to step 114L, and determination is made on whether or not the currently acquired current pointer ID is applied with the incorrect contact information. If the determination is negative, the procedure proceeds to step 114K. Meanwhile, if the determination is positive, the procedure proceeds to step 114M, and the incorrect contact information is deleted from the current pointer ID. Thereafter, the procedure proceeds to step 114K.

At step 114K, determination is made on whether or not there is any other pointer ID corresponding to a trajectory based on a currently detected contact. If the determination is positive, the procedure returns to the above-described step 114H. Meanwhile, if the determination is negative, the present incorrect contact determination process program is completed.

Figure 10:
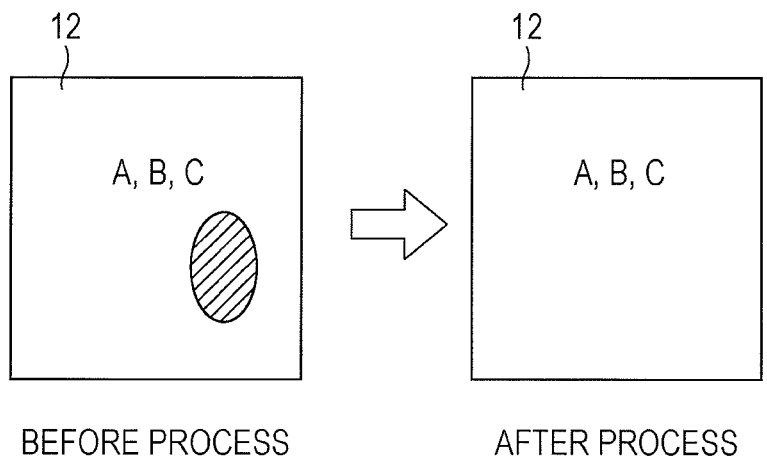
FIG. 10 is a schematic diagram illustrating an example of a process of deleting a trajectory based on an incorrect contact in the liquid crystal pen tablet according to the exemplary embodiment.
Figure 11:
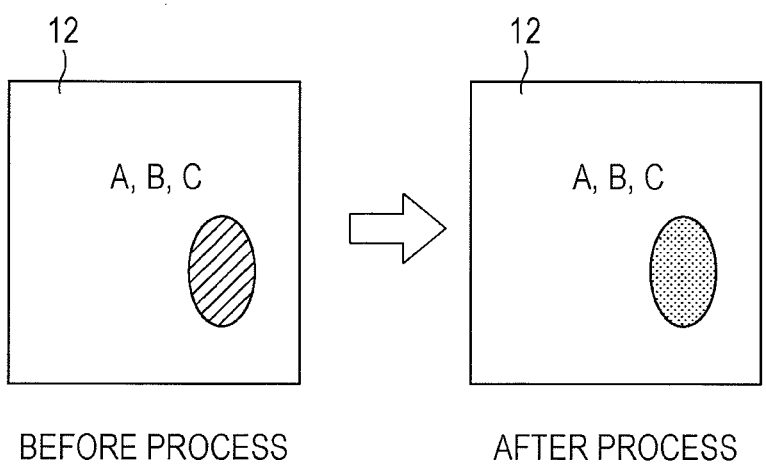
FIG. 11 is a schematic diagram illustrating an example of a process of changing the color of a trajectory based on an incorrect contact in the liquid crystal pen tablet according to the exemplary embodiment.

Meanwhile, if the determination is nagative at step 100 or 104 illustrated in FIG. 3, the procedure proceeds to step 116. At step 116, determination is made on whether or not the pointer IDs currently stored in the storage area α include a pointer ID applied with the incorrect contact information, to thereby identify a trajectory representing the incorrect contact. If the determination is negative at the present step 116, the present contact detection process program is completed. Meanwhile, if the determination is positive, the procedure proceeds to step 118. At step 118, the pointer ID applied with the incorrect contact information is acquired, and a predetermined process is performed on an image on the screen of the LCD 12B corresponding to the position of the trajectory identified by the acquired pointer ID (e.g., a trajectory corresponding to the trajectory drawn on the touch panel 12A on the basis of the incorrect contact, or an image indicating a state in which a button included in a screen already displayed on the touch panel 12A (e.g., menu screen) is turned on as a result of unintentional pressing of the button due to the incorrect contact). Thereafter, the present contact detection process program is completed. The predetermined process includes, for example, a process of deleting the image displayed on the screen of the LCD 12B on the basis of the incorrect contact, as illustrated in FIG. 10, and a process of changing the color of the image displayed on the screen of the LCD 12B on the basis of the incorrect contact to a specific color (a color predetermined as the color indicating the image displayed on the basis of the incorrect contact), as illustrated in FIG. 11. Further, if the image displayed on the screen of the LCD 12B on the basis of the incorrect contact is a trajectory corresponding to the trajectory drawn on the touch panel 12A, the predetermined process includes a process of changing the thickness or line type of the trajectory.

In the liquid crystal pen tablet 10 according to the present exemplary embodiment, with the above-described contact detection process program thus executed by the controller 22, whether or not the trajectory drawn in accordance with the contact with the touch panel 12A is based on the incorrect contact is easily and highly accurately determined. Further, the coordinate information is managed by the pointer ID. Therefore, if the information of the trajectory drawn on the basis of the incorrect contact is deleted from the storage area α to leave in the storage area α only the information of the trajectory (e.g., pointer ID and coordinate information) drawn on the basis of the correct contact, the controller 22 displays a trajectory on the LCD 12B on the basis of the information of the trajectory drawn on the basis of the correct contact. Accordingly, readability is improved, without display of an unnecessary trajectory (image) based on the incorrect contact. Further, a user is not required to care whether the image displayed on the LCD 12B is based on the incorrect contact or the correct contact.

Figure 12:
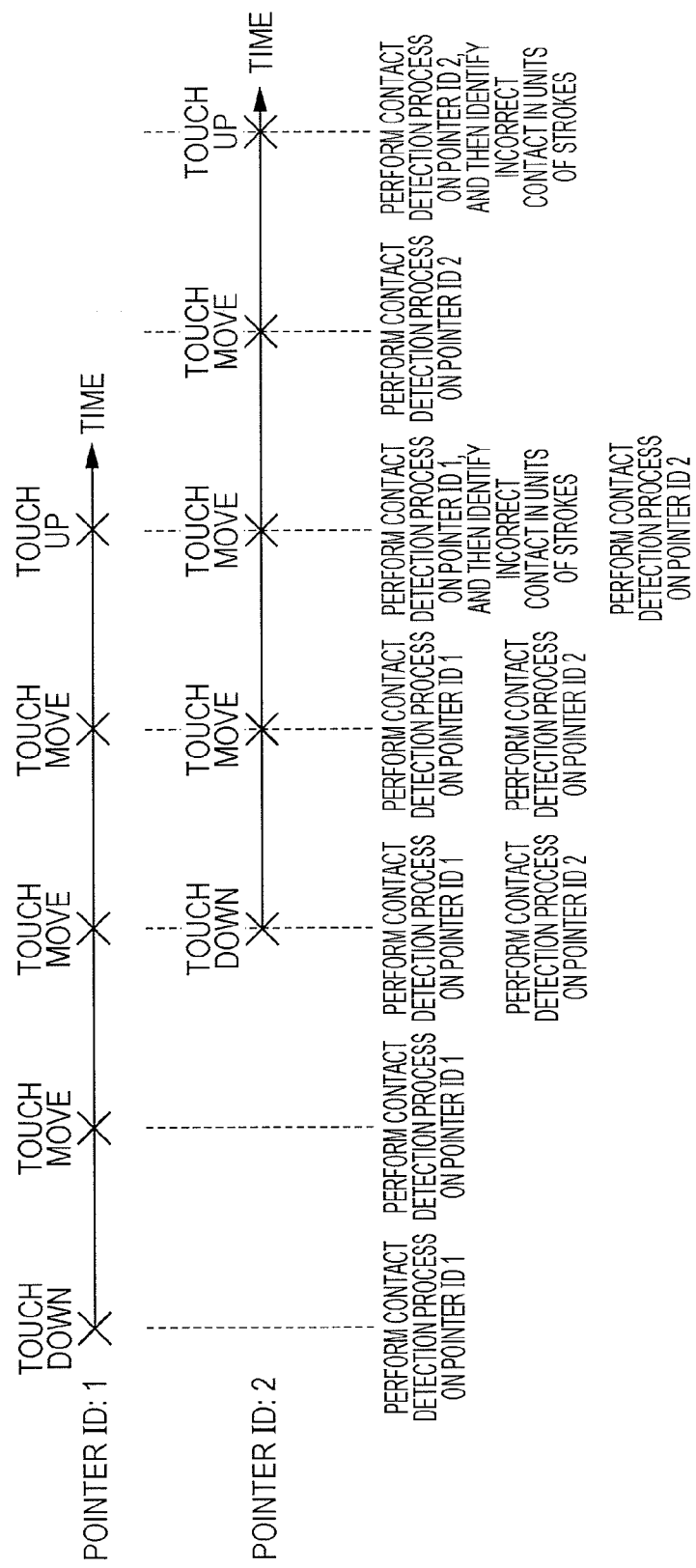
FIG. 12 is a conceptual diagram illustrating a chronological concept in a case where a contact detection process is concurrently performed on plural trajectories in the liquid crystal pen tablet according to the exemplary embodiment.

Further, according to the liquid crystal pen tablet 10 according to the present exemplary embodiment, even if there are plural trajectories, whether or not each of the trajectories is based on the incorrect contact is easily and highly accurately determined. For example, if there are trajectories applied with pointer IDs 1 and 2, respectively, as illustrated in FIG. 12, determination of whether or not a trajectory is based on the incorrect contact is separately (concurrently) made for the respective trajectories every predetermined time. Then, identification of a trajectory based on the incorrect contact is performed separately for the pointer IDs 1 and 2, when the contact corresponding to the trajectory is cancelled.

Figure 13:
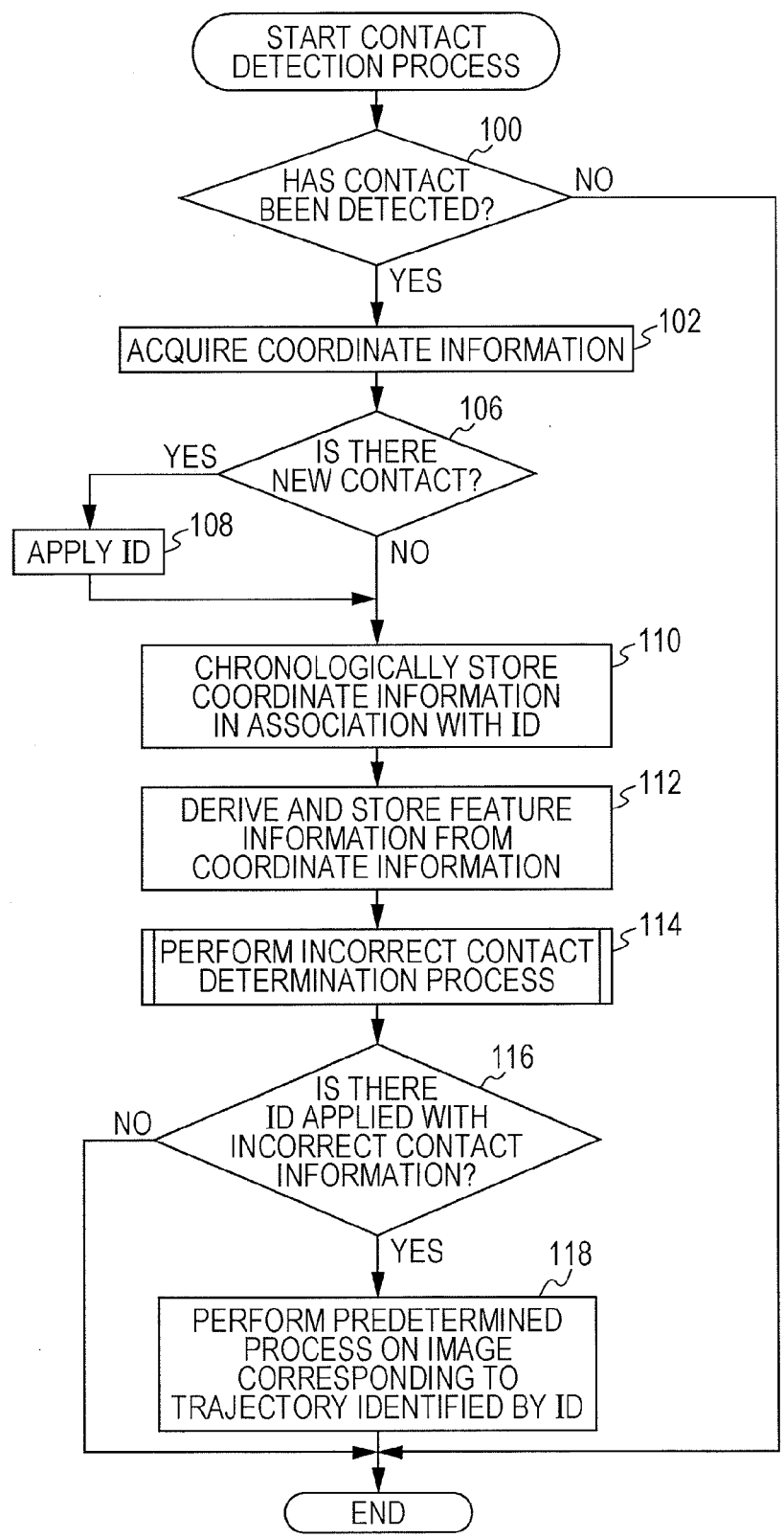
FIG. 13 is a flowchart illustrating a modified example of the process flow of the contact detection process program according to the exemplary embodiment.

In the above-described exemplary embodiment, description has been made of the configuration example which makes the final determination of whether or not the trajectory is based on the incorrect contact, when non-contact is detected (when the contact with the touch panel 12A is cancelled). However, the configuration is not limited thereto, and the final determination of whether or not the trajectory is based on the incorrect contact may be made every predetermined time (20 ms) corresponding to the execution time taken for one execution of the contact detection process program. In this case, the processes of the above-described steps 116 and 118 may be performed every time the incorrect contact determination process is performed, as illustrated in FIG. 13 as an example. In this case, the conclusion as to whether or not the trajectory is based on the incorrect contact is promptly obtained, as compared with the example described in the above-described exemplary embodiment. Due to the prompt determination of the incorrect contact, therefore, this configuration is particularly effective in, for example, the signing of an important signature with the liquid crystal pen tablet 10, wherein an input error is impermissible. The flowchart illustrated in FIG. 13 is different from the flowchart illustrated in FIG. 3 in that step 104 is removed, that steps 116 and 118 are shifted to a position after step 114, and that the contact detection process program is completed in accordance with the nagative determination at step 100. Further, the user may be prompted to specify whether to adopt the process of the flowchart illustrated in FIG. 3 (contact detection process) or the process of the flowchart illustrated in FIG. 13. This configuration improves convenience.

Further, in the above-described exemplary embodiment, description has been made of the example which sets the predetermined time to 20 ms. However, the predetermined time is not limited thereto. The predetermined time may be any other time, and may also be specified by the user. If 5 ms is adopted as the predetermined time, however, it is difficult to execute the above-described contact detection process program every predetermined time (5 ms), as compared with the case where 20 ms is adopted as the predetermined time. When non-contact is detected, therefore, the final determination of whether or not the trajectory is based on the incorrect contact may be made on the basis of data accumulated by then. If the contact detection process program is thus executed every 5 ms, it is desirable to accumulate (prepare) data to be used in a subsequent routine (e.g., coordinate information and feature information) during the execution of a preceding routine to prevent delay of the subsequent routine (e.g., subsequent contact detection process).

Further, in the above-described exemplary embodiment, description has been made of the configuration example which adopts the area of the trajectory as the magnitude information, the variance of the area of the trajectory and the variance of the length of the trajectory as the degree information, and the number of the contact points in the trajectory as the duration-based information. However, the area of the trajectory may be replaced by the length of the trajectory, and the variance of the area of the trajectory and the variance of the length of the trajectory may be replaced by the standard deviation of the area of the trajectory and the standard deviation of the length of the trajectory, respectively. Further, the number of the contact points in the trajectory may be replaced by the duration of the contact. Further, the area of the trajectory and the length of the trajectory may be replaced by the maximum value, the minimum value, or the mean value of the area and the maximum value, the minimum value, or the mean value of the length, respectively.

Further, in the above-described exemplary embodiment, description has been made of the configuration example which determines whether or not the trajectory is based on the incorrect contact with the use of the decision tree. However, the determination may be made with the use of a template matching method, a k-nearest neighbor classification method, a neutral network, a support vector machine, a hidden Markov model, a boosting method, or the like, in place of the decision tree. Also in the case using one of these methods, the feature information and the determination results collected for learning are fed back and used again as data for learning.

Further, in the above-described exemplary embodiment, description has been made of the configuration example which forcibly performs the predetermined process (deletion or change in color) on the image displayed on the screen of the LCD 12B on the basis of the incorrect contact. However, a configuration may be adopted which allows the user to previously provide the liquid crystal pen tablet 10 with an instruction of whether or not to perform the predetermined process on the image displayed on the basis of the incorrect contact, and which does not perform the predetermined process on the image displayed on the basis of the incorrect contact if an instruction not to perform the predetermined process has previously been provided, and performs the predetermined process on the image displayed on the basis of the incorrect contact if an instruction to perform the predetermined process has previously been provided. These instructions may be provided via the touch panel display 12 or in accordance with ON and OFF of an instruction switch separately provided to the liquid crystal pen tablet 10. Further, the instructions may be provided to the liquid crystal pen tablet 10 through a remote control using wired or wireless communication.

Further, in the above-described exemplary embodiment, description has been made of the configuration example which handles the contact of the stylus pen 16 as the correct contact. However, this is an example employed for convenience. Whether or not a contact is the incorrect contact is after all determined on the basis of the determination of whether or not the feature information obtained from the contact with the touch panel 12A corresponds to the previously registered data (e.g., incorrect contact feature information). It is therefore needless to say that the determination result does not rely on the type of the object (instruction object) that comes into contact with the touch panel 12A.

Further, in the above-described exemplary embodiment, description has been made of the configuration example which determines, for each of the trajectories identified by the pointer IDs, whether or not the trajectory is based on the incorrect contact. However, a configuration may be adopted which, if it is determined within a predetermined period in accordance with the above-described majority rule that a trajectory is based on the incorrect contact, determines that the trajectories drawn on the touch panel 12A within the period are all based on the incorrect contact.

Further, the above-described exemplary embodiment determines, on the basis of the determination of whether or not the feature information is included in one of the first to third incorrect contact areas, whether or not the trajectory is based on the incorrect contact. However, the configuration is not limited thereto. Whether or not the trajectory is based on the incorrect contact may be determined on the basis of a determination of whether or not the feature information corresponds to information previously registered as the incorrect contact feature information representing a feature of the trajectory based on the incorrect contact. Further, plural items of the incorrect contact feature information may be registered. In this case, a configuration example may be adopted which determines that the trajectory is based on the incorrect contact, if the feature information corresponds to one of the incorrect contact feature information items.

Further, in the above-described exemplary embodiment, description has been made of the configuration example which determines whether or not the trajectory is based on the incorrect contact by using the majority rule. However, the configuration is not limited thereto. Whether or not the trajectory is based on the incorrect contact may be determined on the basis of a determination of whether or not the number of contact points determined as the incorrect contact is equal to or more than a predetermined number.

Further, in the above-described exemplary embodiment, description has been made of the configuration example which directly determines the incorrect contact with the touch panel 12A to distinguish between the correct contact and the incorrect contact on the basis of the result of the determination. Conversely, however, the correct contact with the touch panel 12A may be directly determined to distinguish between the correct contact and the incorrect contact on the basis of the result of the determination. In this case, determination is made on, for example, whether or not the feature information is included in the area represented by the second correct contact area information illustrated in FIG. 8. If it is determined that the feature information is included in the area, the flag is set. Then, determination is made on whether or not the number of the flags is more than half the number of all contact points. If it is determined that the number of the flags is more than half the number of all contact points, the pointer ID identifying the trajectory, in which the number of the flags is determined to be more than half the number of all contact points, is applied with correct contact information indicating that the trajectory has been drawn on the basis of the correct contact, to thereby identify the trajectory based on the correct contact and identify any other trajectory as the trajectory based on the incorrect contact. It is needless to say that the final conclusion of whether or not the trajectory is based on the correct contact may be drawn every predetermined time (e.g., 20 ms) also in this case without the determination of whether or not the number of the flags is more than half the number of all contact points. With this determination of whether or not the feature information corresponds to previously registered specific contact feature information (correct contact feature information or incorrect contact feature information) representing a feature of a trajectory drawn on the basis of a specific contact (correct contact predetermined as the correct contact with the touch panel 12A or incorrect contact predetermined as the incorrect contact with the touch panel 12A) with the touch panel 12A, the correct contact and the incorrect contact are highly accurately determined.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A contact detecting device comprising:
    a plurality of detecting elements that are related to one another in a two-dimensional configuration on a predetermined contacted surface, and respectively detect a contact of an object with the contacted surface;
    a generating unit that generates, on the basis of the result of detection by the plurality of detecting elements, feature information on plural contact points which represents a feature of a trajectory drawn on the basis of a contact of an object with the contacted surface;
    a determining unit that determines whether or not each of the feature information generated by the generating unit corresponds to previously registered specific contact feature information representing a feature of a trajectory drawn on the basis of a specific contact of an object with the contacted surface; and
    an identifying unit that identifies the trajectory as an incorrect contact information on the basis of a number of the feature information determined, by the determining unit, to be corresponding to the specific contact feature information,
    wherein the feature information represents at least one characteristic of a sequence of contact points obtained when the object continuously contacts the contacted surface, and
    wherein the previously registered specific contact feature information represents at least one characteristic of a sequence of contact points of a reference trajectory.

2. The contact detecting device according to claim 1, wherein the specific contact corresponds to a correct contact predetermined as a correct contact with the contacted surface or an incorrect contact predetermined as an incorrect contact with the contacted surface.

3. The contact detecting device according to claim 1, further comprising:
    an associating unit that associates identification information identifying the trajectory with the trajectory,
    wherein the determining unit determines, for each trajectory identified by the identification information, whether or not the feature information generated by the generating unit corresponds to the specific contact feature information.

4. The contact detecting device according to claim 1, wherein, if the number of determinations made by the determining unit during the predetermined period that the feature information generated by the generating unit corresponds to the specific contact feature information is more than the number of determinations made by the determining unit during the predetermined period that the feature information generated by the generating unit does not correspond to the specific contact feature information, the identifying unit identifies the trajectory drawn on the contacted surface during the predetermined period as the trajectory representing the specific contact.

5. The contact detecting device according to claim 1, wherein the predetermined period corresponds to the period from the contact of an object with the contacted surface to the separation of the object from the contacted surface.

6. The contact detecting device according to claim 1, wherein the feature information corresponds to at least one of magnitude information representing the magnitude of the trajectory, degree information representing the degree of variation of the magnitude of the trajectory, and duration-based information derived on the basis of the time of a continuous contact of an object with the contacted surface.

7. The contact detecting device according to claim 6, wherein the magnitude information corresponds to information representing at least one of the area of the trajectory and the length of the trajectory,
    wherein the degree information corresponds to at least one of trajectory area statistical information representing the variance or standard deviation of the area of the trajectory and trajectory length statistical information representing the variance or standard deviation of the length of the trajectory, and
    wherein the duration-based information corresponds to trajectory number information representing the number of contact points in the trajectory.

8. The contact detecting device according to claim 1, wherein the determining unit determines, with the use of a decision tree configured to include the specific contact feature information, whether or not the feature information generated by the generating unit corresponds to the specific contact feature information.

9. The contact detecting device according to claim 1, further comprising:
an applying unit that applies to the trajectory a weight according to a contact time,
wherein the determining unit further determines whether or not the weight applied by the applying unit is equal to or greater than a predetermined weight.

10. The contact detecting device according to claim 1, wherein the feature information corresponds to degree information representing the variance or standard deviation of a travel distance between contact points of the current trajectory.

11. A contact detecting device comprising:
a plurality of detecting elements that are related to one another in a two-dimensional configuration on a predetermined contacted surface, and respectively detect a contact of an object with the contacted surface;
a generating unit that generates, on the basis of the result of detection by the plurality of detecting elements, feature information on plural contact points which represents a feature of a trajectory drawn on the basis of a contact of an object with the contacted surface;
a determining unit that determines whether or not each of the feature information generated by the generating unit is included in a previously registered specific contact feature area representing a feature of a trajectory drawn on the basis of a specific contact of an object with the contacted surface; and
an identifying unit that identifies the trajectory as an incorrect contact information on the basis of a number of the feature information determined, by the determining unit, to be corresponding to the specific contact feature information,
wherein the feature information represents at least one characteristic of a sequence of contact points obtained when the object continuously contacts the contacted surface, and
wherein the previously registered specific contact feature area represents at least one characteristic of a sequence of contact points of a reference trajectory.

12. A record display device comprising:
the contact detecting device according to claim 1; and
a display that has the contact detecting device superimposed on a screen thereof, and displays on the screen an image according to the result of detection by the contact detecting device.

13. The record display device according to claim 12, further comprising:
a deleting unit that deletes from the screen an image displayed at a position corresponding to a trajectory identified on the basis of the result of determination by the determining unit.

14. A non-transitory computer readable medium storing a program causing a computer to execute a process for detecting a contact, the process comprising:
controlling a contact detecting device including a plurality of detecting elements related to one another in a two-dimensional configuration on a predetermined contacted surface to respectively detect a contact of an object with the contacted surface;
generating, on the basis of the result of detection, feature information on plural contact points which represents a feature of a trajectory drawn on the basis of a contact of an object with the contacted surface;
determining whether or not each of the generated feature information corresponds to previously registered specific contact feature information representing a feature of a trajectory drawn on the basis of a specific contact of an object with the contacted surface; and
identifying the trajectory as an incorrect contact information on the basis of a number of the feature information determined, by the determining, to be corresponding to the specific contact feature information,
wherein the feature information represents at least one characteristic of a sequence of contact points obtained when the object continuously contacts the contacted surface, and
wherein the previously registered specific contact feature information represents at least one characteristic of a sequence of contact points of a reference trajectory.

15. A non-transitory computer readable medium storing a program causing a computer to execute a process for detecting a contact, the process comprising:
controlling a contact detecting device including a plurality of detecting elements related to one another in a two-dimensional configuration on a predetermined contacted surface to respectively detect a contact of an object with the contacted surface;
generating, on the basis of the result of detection, feature information on plural contact points which represents a feature of a trajectory drawn on the basis of a contact of an object with the contacted surface;
determining whether or not each of the generated feature information is included in a previously registered specific contact feature area representing a feature of a trajectory drawn on the basis of a specific contact of an object with the contacted surface; and
identifying the trajectory as an incorrect contact information on the basis of a number of the feature information determined, by the determining, to be corresponding to the specific contact feature information,
wherein the feature information represents at least one characteristic of a sequence of contact points obtained when the object continuously contacts the contacted surface, and
wherein the previously registered specific contact feature area represents at least one characteristic of a sequence of contact points of a reference trajectory.

16. A contact detecting method comprising:
relating a plurality of detecting elements to one another in a two-dimensional configuration on a predetermined contacted surface to respectively detect a contact of an object with the contacted surface;
generating, on the basis of the result of detection, feature information on plural contact points which represents a feature of a trajectory drawn on the basis of a contact of an object with the contacted surface;
determining whether or not each of the generated feature information corresponds to previously registered specific contact feature information representing a feature of a trajectory drawn on the basis of a specific contact of an object with the contacted surface; and
identifying the trajectory as an incorrect contact information on the basis of a number of the feature information determined, by the determining, to be corresponding to the specific contact feature information,
wherein the feature information represents at least one characteristic of a sequence of contact points obtained when the object continuously contacts the contacted surface, and wherein the previously registered specific contact feature information represents at least one characteristic of a sequence of contact points of a reference trajectory.

* * * * *